United States Patent Office 3,179,701
Patented Apr. 20, 1965

3,179,701
(3,5-DIALKYL-4-HYDROXYPHENYL) (3,5-DI-ALKYL-4-HYDROXYBENZYL)SULFIDES
Albert L. Rocklin, Walnut Creek, Calif., assignor to Shell Oil Company, New York, N.Y., a corporation of Delaware
No Drawing. Filed May 14, 1962, Ser. No. 194,645
3 Claims. (Cl. 260—609)

This invention relates to novel sulfur-containing bisphenols and to compositions containing them. More particularly, the invention relates to novel cryptophenolic sulfides and to stabilized compositions in which they are incorporated.

INTRODUCTION

The use of such light-colored bisphenols as the bis-(3,5-dialkyl-4-hydroxyphenyl)methanes described by Coffield et al., U.S. 2,944,086, issued July 5, 1960, as antioxidants, is known in the art. A defect of these bisphenols, however, is their tendency to discolor on slight oxidation, particularly when that oxidation is catalyzed by traces of acids or metal salts with which the bisphenols come in contact.

In many uses, the development of such colors is detrimental. For example, the colored oxidation products must be removed from the bisphenols before the bisphenols can be incorporated in such light-colored items as transparent polyethylene films, in white sidewall rubber stock, and in light-colored rubber latices intended for coating or paint applications. Removal of the colored products is inconvenient and adds to the cost of the resulting decolorized bisphenol.

OBJECTS

It is an object of the present invention to provide novel bisphenols having superior stabilizing properties. Another object of the invention is the provision of bisphenols which do not undergo conversion to colored oxidation products. Still other objects of the invention are novel stabilized compositions containing the new bisphenols and which have superior resistance to oxidative deterioration. The provision of a novel process for preparing the bisphenols is yet another object. Particular (3,5 - di - tert - alkyl - 4 - hydroxyphenyl) (3,5 - di - tert-alkyl-4-hydroxybenzyl)sulfides, their use in organic compositions normally subject to oxidative deterioration, and their preparation, are other objects of the invention. Still other objects will be apparent from the following detailed description of the invention.

STATEMENT OF THE INVENTION

These objects are accomplished by novel (3,5-dialkyl-4 - hydroxyphenyl) (3,5 - dialkyl - 4 - hydroxybenzyl) sulfides where in each alkyl group has up to 8 carbon atoms and at least one alkyl group on each phenyl ring is branched on the alpha carbon atom; and by stabilized compositions containing them.

BISPHENOLS

The novel sulfur-containing bisphenols of the invention are those asymmetrical bisphenolic sulfides of the structure

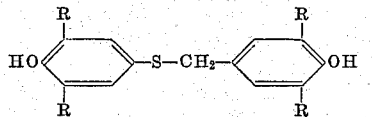

wherein each R is alkyl of up to 8 carbon atoms, and at least one R on each phenyl ring is branched on the alpha carbon atom. In the preferred embodiment of the invention, each R is branched on the alpha carbon atom.

By virtue of their possession of at least one, and preferably two, sterically-large alkyl groups ortho to each hydroxy group, the bisphenols of the invention are substantially unreactive as phenols. They are thus cryptophenolic, the reactivity of the phenolic hydroxyl being hindered by the two adjacent alkyl radicals. This particular structure appears to be in part responsible for their superior performance as antioxidants. They are, however, unexpectedly superior as stabilizers to other analogous compounds which also contain hindered phenol groups, for example, the bis(3,5-di-tert-butyl-4-hydroxyphenyl)methane noted above.

Exemplary of the compounds of the invention are such bisphenols as (3-methyl-5-isopropyl-4-hydroxyphenyl) (3-methyl - 5 - isopropyl - 4 - hydroxybenzyl)sulfide; (3-methyl - 5 - tert - butyl - 4 - hydroxyphenyl) (3 - methyl-5 - tert - butyl - 4 - hydroxybenzyl)sulfide; (3 - ethyl - 5-tert - amyl - 4 - hydroxyphenyl) (3 - ethyl - 5 - tert - amyl-4 - hydroxybenzyl) sulfide; (3 - butyl - 5 - tert - octyl-4 - hydroxyphenyl) (3 - butyl - 5 - tert - octyl - 4 - hydroxybenzyl)sulfide, and the like.

Preferred types of the bisphenols are such compounds as (3,5 - diisopropyl - 4 - hydroxyphenyl) (3,5 - diisopropyl - 4 - hydroxybenzyl)sulfide; (3,5 - dicyclohexyl-4 - hydroxyphenyl) (3,5 - dicyclohexyl - 4 - hydroxybenzyl)sulfide; (3,5 - di - sec - butyl - 4 - hydroxyphenyl) (3,5 - di - sec - butyl - 4 - hydroxybenzyl)sulfide; (3,5-di - sec - butyl - 4 - hydroxyphenyl) (3,5 - di - sec - butyl-4 - hydroxybenzyl)sulfide; (3,5 - di - tert - butyl - 4 - hydroxyphenyl) (3,5 - di - tert - butyl - 4 - hydroxybenzyl)-sulfide; and (3,5-di-tert-octyl-4-hydroxyphenyl) (3,5-di-tert-octyl-4-hydroxybenzyl)sulfide; and the like. While the tetra-sec-alkyl and the tetra-tert-alkyl-substituted bisphenols represent the preferred class of compounds, the tetra-tert-alkyl are most preferred, because of the superior obstruction of the two phenolic hydroxyls afforded by the ortho-tertiary alkyl substituents.

Because of the unique manner by which the bisphenols of the invention are prepared, it is a feature of the invention that unsymmetrical bisphenols are also afforded. By unsymmetrical is meant compounds wherein one or both of the substituents on the thiophenyl ring are different from those on the benzyl ring. Such bisphenols are represented by the structure

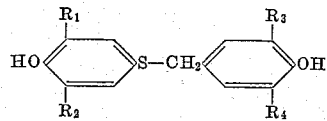

wherein all of the R's are alkyl of up to 8 carbon atoms, at least one R on each phenyl ring is branched on the alpha carbon atom, and $R_3$ and $R_4$ are different in structure or number of carbon atoms, or both, from $R_1$ and $R_2$.

Exemplary of such unsymmetrical bisphenols are (3 - methyl - 5 - tert - butyl - 4 - hydroxyphenyl) (3,5-diisopropyl - 4 - hydroxybenzyl)sulfide; (3,5 - diisopropyl - 4 - hydroxyphenyl) (3,5 - di - tert - butyl - 4 - hydroxybenzyl)sulfide; (3 - isopropyl - 5 - methyl - 4 - hydroxyphenyl) (3 - tert - butyl - 5 - tert - heptyl - 4 - hydroxybenzyl)sulfide; and the like. An important advantage of such compounds is their provision in one molecule of two phenolic hydroxyl groups activated in different manners and, because of the difference in the manner in which they are hindered, reactive at different rates.

PREPARATION

The novel bisphenols of the invention are readily prepared by the liquid-phase condensation of a 3,5-dialkyl-4-hydroxyphenyl mercaptan with a 3,5-dialkyl-4-hydroxybenzyl alcohol.

The 3,5-dialkyl-4-hydroxyphenyl mercaptan is that mercaptan wherein each of the alkyl groups has up to 8 carbon atoms, preferably from 3 to 8 carbon atoms, and at least one alkyl group, and preferably both, is branched on the alpha carbon atom. Such compounds may be represented by the formula

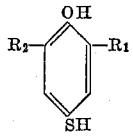

wherein $R_1$ and $R_2$ are each an alkyl group of the type described.

Exemplary mercaptans include 3-methyl-5-isopropyl-4-hydroxyphenyl mercaptan; 3,5 - diisopropyl-4-hydroxyphenyl mercaptan; 3 - isopropyl-5-tert-butyl - 4 - hydroxyphenyl mercaptan; 3,5-di-tert-butyl - 4 - hydroxyphenyl mercaptan; 3-sec-butyl-5-tert-hexyl - 4 - hydroxyphenyl mercaptan; 3,5-di-tert-octyl-4-hydroxyphenyl mercaptan; and 3-ethyl-5-cyclohexyl-4-hydroxyphenyl mercaptan.

The mercaptan of the type described is reacted with a 3,5-dialkyl - 4 - hydroxybenzyl alcohol to afford the bisphenols of the invention. Such alcohols are those wherein each of the alkyl groups has up to 8 carbon atoms, and preferably from 3 to 8 carbon atoms; and wherein at least one, and preferably both, of the alkyl groups is branched on the alpha carbon atom. Such alcohols are those of the formula

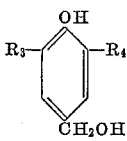

wherein each of $R_3$ and $R_4$ is an alkyl group of the type described.

Exemplary benzyl alcohols are 3-methyl-5-isopropyl-4-hydroxybenzyl alcohol; 3,5-diisopropyl - 4 - hydroxybenzyl alcohol; 3-isopropyl - 5 - tert-butyl - 4 - hydroxybenzyl alcohol; 3,5-di-tert-butyl-4-hydroxybenzyl alcohol; 3 - pentyl - 5 - cyclohexyl - 4 - hydroxybenzyl alcohol; 3,5 - dicyclopentyl - 4 - hydroxybenzyl alcohol; and 3,5-di-tert-octyl-4-hydroxybenzyl alcohol.

Because of the hindered nature of their phenolic hydroxy groups, the mercaptan and benzyl alcohol described react at the thiol and benzylic hydroxyl functions respectively to form the bisphenol product of the type described above. While the reaction goes slowly in the absence of a catalyst, the use of a condensation or alkylation catalyst for the reaction is helpful. For example, basic catalysts are quite effective. The metal hydroxides, particularly such compounds as potassium hydroxide and sodium hydroxides, are particularly useful as catalyst for the condensation.

Acidic catalysts, such as mineral acids, sulfo acids and Friedel-Crafts catalysts, are also effective for the reaction. Typical mineral acids are sulfuric acid, hydrofluoric acid and phosphoric acid, while useful sulfo acids are the sulfonic acids such as p-toluene-sulfonic acid, ethanesulfonic acid and benzenesulfonic acid. Friedel-Crafts catalysts, including aluminum chloride, boron trifluoride, ferric chloride, zinc chloride and the like, may also be employed.

The catalysts are employed in a catalytic amount which, depending on the reactants and the reaction conditions, may range from about 0.15% w. to about 100% w., base on the hydroxybenzyl alcohol. Preferred concentration of catalyst is about 0.1% w. to about 10% w., on the same basis.

The reaction is conducted in liquid phase, preferably in an inert organic solvent. Suitable solvents include the ethers, such as diethyl ether, diisopropyl ether, diamyl ether, tetrahydrofuran, dioxane, and the like. Hydrocarbon liquids, including such paraffins as pentane, hexane, heptane, cyclohexane, octane, and isooctane, may also be used, as may such aromatic solvents as benzene, toluene, the xylenes, and the like. Alcohols, such as methanol, ethanol, isopropanol, propanol, butanol, tert, butanol, ethylene glycol and propylene glycol, may also be used. Also useful are such halogenated solvents as carbon tetrachloride, chloroform, methylene dichloride, ethylene dichloride, propylene dibromide, and the like. Other inert organic liquids may be employed, but the solvent should preferably be one boiling at or above 50° C. Solvents not miscible with water are preferred, since the reaction proceeds best when conducted under anhydrous conditions.

When conducted in the manner described, the condensation proceeds readily at temperatures between about 0° C. and about 100° C. A convenient mode of conducting the reaction with solvents boiling in this range is to operate at the reflux temperature of the solvent at atmospheric pressure. However, superatmospheric or subatmospheric pressures may be employed if desired. The reaction is most economically conducted with substantially equimolar amounts of the two reactants, although an excess of either, most conveniently up to about a 10 molar excess, may be employed if desired.

The preparation of the bisphenols is readily achieved by mixing the reactants and catalyst in the solvent and, after the reaction has proceed to the desired degree, terminating the reaction by cooling, flooding with water, or the like. The product bisphenol may then be readily separated from the reaction system by such methods as distillation, extraction, crystallization, or the like. The process, being readily adapted for conventional chemical techniques and equipment, may be conducted in a batch, semi-batch or continuous manner with equal facility.

The purified products are white or light-colored crystalline solids at room temperature, characterized by sharp melting points. They are particularly impervious to discoloration upon oxidation, and are therefore superior antioxidants for materials which upon preparation or use are subject to heat, air, ozone or other oxidizing conditions.

COMPOSITIONS

The novel stabilized compositions of the invention are those comprising an organic composition normally subject to oxidative deterioration, containing a stabilizing amount of the (3,5-dialkyl-4-hydroxyphenyl)(3,5-dialkyl-4-hydroxybenzyl)sulfide described above.

By organic material normally subject to oxidative deterioration is meant the material, based in whole or in part on a skeleton comprising interconnected carbon atoms which, upon exposure to oxygen, light, heat or a combination thereof, loses its desirable properties and becomes weak, brittle, cracked, discolored, viscous or the like. Exemplary organic materials are plastics, particularly polyolefins and vinyl resins; hydrocarbon liquids, particularly gasoline and lubricating or fuel oils; hydrocarbon solids or semi-solids, such as waxes, greases and the like; elastomers, such as natural and synthetic rubber; and feeds or foodstuffs.

Typical plastics, for example, are such solid organic high-polymeric materials as the polyvinylic resins, including the polyvinyl halides, e.g., polyvinyl chloride, polyvinylidene chloride and polyvinyl fluoride, the polyvinyl acetals, such as polyvinyl butyral, and the polymeric esters of vinylic acids, such as polymethyl acrylate and polymethyl methacrylate. Polyvinyl benzenes, such as polystyrene and polymerized divinyl benzene, are usefully stabilized with the above phenols. Cellulosic polymers, such as cellulose acetate, cellulose butyrate and cellulose nitrate may also be readily stabilized by incorporation therein of the bisphenols described.

One class of compositions of the type described are those comprising a polymerized alpha-olefin containing a stabilizing amount of the (3,5-dialkyl-4-hydroxybenzyl) (3,5-dialkyl-4-hydroxyphenyl)sulfides of the invention wherein each of the alkyl radicals on said chloride has from 3 to 8 carbon atoms and is branched on the alpha carbon atom. Preferred polymers for the compositions of this invention are those normally solid polymers of alpha-olefins having up to three carbon atoms, e.g., ethylene and propylene, and their copolymers.

The polymers of alpha-olefins stabilized by the compounds of the invention are those normally solid hydrocarbon polymeric materials which are obtained by polymerizing such monoolefins as ethylene, propylene, butene-1, pentene-1, 3-methyl-butene-1, hexene-1, 4-methyl-pentene-1, 4-methyl-hexene-1, 4,4-dimethyl-pentene-1, and the like, as well as their copolymers, e.g., ethylene-propylene copolymers and the like. By "stabilizing amount" is meant an amount of the hydroxybenzyl bisphenol sufficient to stabilize the composition against oxidative, thermal and ultraviolet deterioration, generally from about 0.005% w. to about 1% w. of the total composition.

The polymers are preferably those prepared by low pressure polymerization methods and, accordingly, they may contain trace amounts of metallic catalyst residues, particularly transition metals of Groups IV–VI of the Mendeleef Periodic Table, and metal residues of a Group I–III metal. For example, many low pressure polymers will contain traces of titanium and aluminum or such other metals as vanadium and zirconium, depending on the particular "Ziegler" catalyst employed in the polymerization. Additionally, the polymers often may contain small amounts of free iron, an impurity which is incorporated in the polymer from the steel apparatus in which the polymerization is conducted.

The polymeric alpha-olefin may be in the form of molding powder, sheets, films, rods, tube, molded forms or the like. Irrespective of the physical form of the polymer, the novel hydroxybenzyl sulfides of the invention are useful to impart improved resistance to all forms of embrittlement and degradation.

Hydrocarbon liquids subject to oxidative attack are also conveniently stabilized with the bisphenols of the invention. Exemplary lubricants include motor lubricating oils, including those containing other types of additives; gear and transmission fluids based on hydrocarbon oils, and the like. Fuel oils, such as furnace oils and light kerosene fractions, including gas turbine fuels, are also stabilized by incorporation therein of the bisphenolic sulfides described. Gasoline containing (3,5-dialkyl-4-hydroxyphenyl) (3,5 - dialkyl - 4-hydroxybenzyl)sulfide is more stable on storage and more resistant to sludging than gasolines not so stabilized.

Solid or semi-solid hydrocarbons, such as wax, grease, and the like, are also improved by incorporation therein of the bisphenols of the invention.

Such solid polymeric elastomers as natural and synthetic rubber are stabilized against hardening, cracking and checking with the sulfur-containing bisphenols described. Exemplary of natural rubbers is *Hevea brasiliensis*, while synthetic rubbers include styrene-butadiene rubber; polybutadiene; polyisoprene; neoprene; butyl rubber; nitrile-butadiene rubbers; styrene-chloroprene rubbers; acrylate-butadiene rubbers; and the like. Polyurethane rubber is also conveniently stabilized against deterioration with such bisphenols, as is polyacrylonitrile.

All of these rubbers deteriorate in the presence of oxygen and ozone by hardening, cracking and checking, and thus losing their resilience and mechanical strength. When these rubbers are processed, as by milling, curing or molding, they are subjected to high temperatures which tend to volatilize some or all of the stabilizer in the rubber.

However, the incorporation into the rubber of the hydroxybenzyl sulfide compounds of the invention renders the resulting rubber composition resistant to oxidative deterioration during processing, since these novel stabilizers are both heat-stable and extremely non-volatile. As a consequence, the rubber compositions stabilized with these compounds have better retention of color, strength, elasticity and resistance to cracking, checking and tearing than rubber compositions containing less stable antioxidants. The bisphenols may thus be added to the rubber at the latex stage during processing on Banbury mills or included with other substances added to the rubber during the course of manufacture.

The bisphenols of the invention are also miscible with and impart enhanced stability to natural fats and oils. Typical stabilized compositions containing such sulfides include those wherein the major portion is an edible oil such as menhaden oil, cod liver oil, safflower oil, castor oil, olive oil, sesame oil, peanut oil, babassu oil, palm oil, corn oil or the like. Fats stabilized with the bisphenols include oleomargarine, lard, butter, beef tallow, animal fat and hydrogenated vegetable shortening products, such as those sold under such trade names as "Spry," "Crisco," "Snowdrift," and the like.

In general, in the stabilized compositions containing the novel bisphenolic compounds described, only an amount of any particular compound sufficient to stabilize the material against oxidative deterioration will be required. The requisite amount will, of course, depend both on the efficacy of the particular sulfide and on the nature of the normally oxidizable substrate in which it is employed. It has been found that amounts of the bisphenol from about 0.0001% by weight to about 10% by weight, based on the organic substrate, are sufficient. For example, suitable concentrations of the bisphenols in distillate fuels, e.g., kerosene, furnace oil, are on the order of 0.0007% w. to about 0.0028% w., while in rubber somewhat larger amounts, up to about 10% w., are required.

It will be understood that, in addition to containing a stabilizing amount of the (dialkyl hydroxybenzyl)(dialkyl hydroxyphenyl)sulfide compounds described, the organic compositions of the invention may contain such other ingredients as other antioxidants, coloring agents, and the like. For example, in rubber or plastic compositions, such additives as pigments, fillers, antiozonants and curing agents will be employed, while in fuel compositions such additives as anti-icing agents, dyes, anti-knock and antimiss agents and similar conventional ingredients will be found. Lubricants will contain gelling agents, extreme pressure additives and such other materials as are employed in commercial preparations. These additives will not interfere with the superior stabilizing effect of the hydroxybenzyl benzene compounds of the invention.

To illustrate the novel benzene compounds of the invention, their preparation and their use, the following examples are given. It should be understood, however, that these examples are merely illustrative and are not to be regarded as limitations to the appended claims since the basic teachings thereof may be varied at will as will be understood by one skilled in the art. In the examples, the proportions are expressed in parts by weight unless otherwise noted.

*Example I*

To a solution of 2.22 g. of 3,5-di-tert-butyl-4-hydroxyphenyl mercaptan in 75 ml. methylene chloride was added 2.20 g. of crystalline 3,5-di-tert-butyl-4-hydroxybenzyl alcohol. The resulting mixture was cooled to 0° C. under nitrogen and 2.5 g. of 80% sulfuric acid was slowly added thereto.

The reaction system was worked up by separating the methylene chloride solution, washing it with aqueous ammonia, drying the organic phase and then evaporating off the solvent under reduced pressure.

The residue was recrystallized from pentane at −8° C. to afford 2.6 g. of white odorless crystals having a melting point of 122.5–123° C. The product was identified as (3,5-di-tert-butyl-4-hydroxyphenyl)(3,5-di-tert-butyl-4-hydroxybenzyl)sulfide. Analysis of the product afforded the following data.

|  | C | H | S | OH eq./100 g. |
|---|---|---|---|---|
| Theory for $C_{29}H_{44}O_2S$ | 76.3 | 9.6 | 7.0 | 0.44 |
| Found | 76.1 | 9.5 | 6.9 | 0.46 |

*Example II*

Using similar proportions of the same reactants in anhydrous isopropanol containing 2.5% m. KOH, based on the 3,5-di-tert-butyl-4-hydroxybenzyl alcohol, the same product is readily formed by maintaining the reaction system at reflux temperature.

*Example III*

Using the method of Example I, the following bisphenols are readily prepared in excellent yield from the reactants noted.

| Benzyl Alcohol | Mercaptan | Product Bisphenol |
|---|---|---|
| 3,5-diisopropyl-4-hydroxyphenyl mercaptan. | 3,5-di-tert-butyl-4-hydroxybenzyl alcohol. | (3,5-diisopropyl-4-hydroxyphenyl)(3,5-di-tert-butyl-4-hydroxybenzyl) sulfide. |
| 3-isopropyl-5-tert-amyl-4-hydroxyphenyl mercaptan. | 3-isopropyl-5-tert-amyl-4-hydroxybenzyl alcohol. | (3-isopropyl-5-tert-amyl-4-hydroxyphenyl)(3-isopropyl-5-tert-amyl-4-hydroxybenzyl) sulfide. |
| 3-methyl-5-tert-butyl-4-hydroxyphenyl mercaptan. | 3-methyl-5-tert-butyl-4-hydroxybenzyl alcohol. | (3-methyl-5-tert-butyl-4-hydroxyphenyl)(3-methyl-5-tert-butyl-4-hydroxybenzyl) sulfide. |

*Example IV*

Using the Dornte method, Ind. Eng. Chem. 34, 927 (1942), a number of candidate antioxidants were evaluated in white mineral oil at 150° C. The results of these tests are set forth in the following table. The oil contained 1% w. iron powder.

| Compound | Conc'n, Percent w. | Induction Period, Hrs. |
|---|---|---|
| Bis(3,5-di-tert-butyl-4-hydroxyphenyl)methane | 0.5 | 19.5 |
| (3,5-di-tert-butyl-4-hydroxyphenyl)(3,5-di-tert-butyl-4-hydroxybenzyl) sulfide. | 0.5 | 28 |
| None | | 0.3 |

These data show that incorporation of the sulfide bridge in the molecule unexpectedly increases the effectiveness of the bisphenol by over 40%.

*Example V*

A number of candidate stabilizers were incorporated in 5-mil thick samples of polypropylene film, and the resulting materials evaluated by heat aging and exposure in the fadeometer.

In the heat aging test, polypropylene film samples 5 mils in thickness were maintained in an oven at 133° C. Each sample was tested for loss of elongation three times a day until the film tore easily. The number of days shown on the table are the total elapsed days before the film tested lost its tensile strength and flexibility.

In the accelerated fadeometer test, the conventional Atlas Weatherometer wherein the arc light source has been supplemented by addition of eight fluorescent ultraviolet light sources, all film samples tested pass within a quarter inch of the light sources. It has been found that in this accelerated exposure test, conditions are approximately eight times as stringent as in the unmodified weatherometer.

The resulting data are presented in the following table.

TABLE

| Compound | Conc'n, Percent w. | Oven Days 133° C. | Fadeometer Days |
|---|---|---|---|
| None | None | <0.5 | ~1.25 |
| Bis(3,5-di-tert-butyl-2-hydroxyphenyl)sulfide | 0.5 | 11.5 | 5.5 |
| (3,5-di-tert-butyl-4-hydroxyphenyl)(3,5-di-tert-butyl-4-hydroxybenzyl)sulfide | 0.5 | 6.5 | 6 |

For comparative purposes, samples of antioxidants tested under comparable conditions in other samples of polypropylene are presented as follows:

| | | | |
|---|---|---|---|
| Bis(2-methyl-6-tert-butyl-4-hydroxyphenyl)sulfide | 0.5% | 3 | 4.5 |
| Bis(3,5-di-tert-butyl-4-hydroxybenzyl)disulfide | 0.5% | 4 | 2.9 |
| Bis(3,5-di-tert-butyl-4-hydroxybenzyl)sulfide | 0.5% | 6 | 3.5 |

From these data, it will be seen that for the same concentration of stabilizer, the bisphenol of the present invention afforded the best combination of heat and light stabilization.

*Example VI*

When samples of natural rubber, each containing 1% w. of one of the substituted bisphenolic sulfides of Examples I and III are exposed to sunlight and oxygen, such samples have after exposure considerably more resistance to cracking, checking and tearing than rubber samples containing no stabilizing agent.

*Example VII*

Samples of motor gasoline containing 0.001% w. of (3,5-di-tert-butyl-4-hydroxyphenyl)(3,5-di-tert-butyl-4-hydroxybenzyl)sulfide are materially stabler on storage at ambient temperature than unstabilized samples of the same gasoline.

*Example VIII*

A crystalline paraffin wax obtained by the dewaxing of an East Texas crude oil distillate and refined by percolation through clay, having a melting point of 138–140° F. was used in this comparative test. The gloss retention test comprises coating a cardboard specimen with a wax composition to produce an initial gloss of about 85–90 units (percent reflectant) when measured with a fixed 60° angle in a standard Gardner glossmeter. After seven days storage at a temperature of 73° F. and a relative humidity of 50%, the gloss level is measured again. The difference between this measurement and the initial gloss is reported as "loss of gloss." Unmodified wax lost 44% of its original gloss under these standardized conditions. The incorporation of 0.1–0.5% by weight of the bisphenols of Examples I–III caused a striking improvement in gloss retention of the stored wax.

I claim as my invention:

1. (3,5-dialkyl - 4 - hydroxyphenyl)(3,5 - dialkyl -4-hydroxybenzyl)sulfide wherein each alkyl radical has up to 8 carbon atoms.

2. (3,5-dialkyl - 4 - hydroxyphenyl)(3,5 - dialkyl -4-hydroxybenzyl)sulfide wherein each alkyl radical has up to 8 carbon atoms, and at least one alkyl radical on each phenyl ring is branched on the alpha carbon atom.

3. (3,5-di-tert-butyl-4-hydroxyphenyl)(3,5-di-tert-butyl-4-hydroxybenzyl)sulfide.

References Cited by the Examiner

UNITED STATES PATENTS

| | | | |
|---|---|---|---|
| 2,976,324 | 3/61 | Long et al. | 260—609 |
| 3,044,960 | 7/62 | Morway et al. | 252—35 |
| 3,054,719 | 9/62 | Uhlenbrach et al. | 167—30 |
| 3,069,384 | 12/62 | Coffield | 260—45.95 |

OTHER REFERENCES

Reid: Organic Chemistry of Bivalent Sulfur, vol. 2, 1960, page 17.

CHARLES B. PARKER, *Primary Examiner.*

L. J. BERCOVITZ, *Examiner.*